United States Patent Office 3,798,127
Patented Mar. 19, 1974

3,798,127
MEDIUM FOR THE CULTURE OF THE ESCHERICHIA COLI STRAIN
Maria Dogariu, Georgeta Alupei, Maria Verdes, Gaby Friedman, Escaterina Grumeza, Tudor Cobzariu, and Ligia Ionescu, Iasi, Rumania, assignors to Fabrica de Antibiotice Iasi, Iasi, Rumania
No Drawing. Filed June 20, 1972, Ser. No. 264,496
Int. Cl. C12b 3/14; C12d 13/10
U.S. Cl. 195—65    6 Claims

ABSTRACT OF THE DISCLOSURE

The invention relates to a medium for the culture of the *Escherichia coli* strain, which is a producer of pencillinacylase (penicilliamidase), a penicillin-splitting enzyme. This medium contains urea in an amount of 0.1 to 1% by weight as a nitrogen source and lecithin in an amount of 0.01 to 0.05% by weight as a promoter of the process for formation of the penicillinacylase enzyme.

SPECIFICATION

This application is related to application Ser. No. 263,114 filed June 15, 1972, now abandoned.

(1) FIELD OF THE INVENTION

The invention relates to a medium for the culture of the *Escherichia coli* (*E. coli*) strain, which is a producer of penicillinacylase (penicillinamidase), a penicillin splitting enzyme.

(2) BACKGROUND OF THE INVENTION

During the last ten years, the drug industry has benefitted from a series of semisynthetic penicillins, based on 6-aminopenicillanic acid, which represents the penicillin-molecule nucleus without the side radical.

The 6-aminopenicillanic acid is easily acylated with the chloro-anhydrides of various acids, thereby making it possible to obtain new penicillin compounds in a practically unlimited number; these new penicillin compounds are useful because they act upon microorganisms (bacteria) on which fermentation penicillins have no effect.

Known processes for producing 6 - aminopenicillanic acid are based either on the fermentation of penicillin producers in media without precursors or on the enzymatic or chemical hydrolysis of penicillins. (See U.S. Pat. No. 3,116,218, Germany Pat. No. 1,114,766 and British Pat. No. 892,144.)

The most used, and also the most economical process use the enzymatic splitting of penicillins into the 6-aminopenicillanic acid and the radical of the respective penicillin.

Penicillinacylase-enzyme production uses actinomycetes, fungi, yeasts and bacteria and, among the latter, the *Escherichia coli* strain which can split penicillin, it is known to use a medium containing as a nitrogen source, ammonium ion, hydrolyzed casein or meat peptone and, as an energy source, glucose, lactose or saccharose; the process involves an aeration and uses a temperature of about 30° C. This medium has the disadvantage of excessive foaming so that an antifoaming agent must be employed. This agent interferes with efforts to maintain constant the aeration level and implicitly influences the growth and normal development of the microorganism. Foaming reduces the capacity and output of the fermentation apparatus. The earlier medium also has the disadvantage that, although it gives good yields of bacterial cell material, the capacity of the so produced pencillin-acylase is, in general, low.

The same disadvantage, i.e. poor enzymatic activity, also characterizes media containing glycerol or salts of organic acids, such as lactic or succinic acids, as carbon energy sources. It is also known to use in a culture medium for the above-described process, phenylacetic acid or its compounds, such as phenylacetimide, phenyl-aceturic acid, phenyl acetylglutamic acid, in amounts of 0.002 to 2% by weight during development of the bacterium subjected to the treatment. Good yields are obtained.

(3) OBJECTS OF THE INVENTION

It is the principal object of the present invention to provide an improved culture medium for an *E. coli* strain capable of producing penicillin-splitting enzyme with high yields.

(4) SUMMARY OF THE INVENTION

The present invention resides in a culture medium for the production of the *E. coli* strains capable of producing pencillin-splitting enzyme as described above and makes use of our discovery that existing culture media can be modified by introducing urea as the nitrogen source and lecithin as a promoter to achieve cultures of higher activity than have been possible heretofore. More particularly, our invention resides in modifying the culture media described in the literature and particularly U.S. Pat. 3,116,218, British Pat. 892,144 and German Pat. 1,114,766 to replace all or part of the peptone or other nitrogen source thereof with 0.1 to 1% by weight (of the culture medium) of urea and, in combination with the urea, providing lecithin in a amount of 0.1 to 0.05% by weight of the media. The lecithin appears to act as a promoter of the formation of the penicillinacylase enzyme and further appears to have a synergistic effect in combination with urea. In other words, the stimulating or promoting effect of the lecithin is less when other nitrogen sources than urea are used.

The present invention avoids the mentioned disadvantages in that, in order to obtain a high yield in terms of penicillin-splitting enzyme, a culture medium is used which contains, as a nitrogen source, urea in an amount of about 0.1 to 1% by weight of the medium and, as a stimulator of the culture of the strain, lecithin in an amount of about 0.01 to 0.05% by weight of the medium, the culture being effected under the known technical conditions.

By known technological conditions, we mean to state that the culture is carried out at a pH of about 7 ($\pm 0.5$, under aerobic conditions, at temperature of 20° C. to 45° C.) as described in the aforementioned publications as to operating parameters. However, we substitute 0.1 to 1% by weight (of the medium) of urea for the peptone-like or other nitrogen sources and we additionally include lecithin in the indicated amount. Apart from this modification, the prior art systems as described in the specific examples of these publications may be used without modification.

(5) SPECIFIC EXAMPLES

The invention is illustrated in the following 14 examples. (Unless otherwise indicated, all percents are by weight.)

Example 1

1 ml. of a bacterial-culture suspension of the *Escherichia coli* strain grown on agar medium for 48 hours at 37° C., was seeded into 750 ml. Erlenmeyer flasks filled with 75 ml. of the following medium:

maize extract 2.5 to 3.5% (calculated as 50% with respect to dried substance) or corn steep liquor;
urea 0.1 to 1.0%;

sodium chloride 0.2 to 0.3%; and
phenylacetamide 0.15 to 0.3%.

The flasks were fitted with a rotating stirring device with a speed of 220 r.p.m. in a thermostat at 30° C., for 20 hours.

The enzymatic potential was determined in the following way:

The bacterial mass resulting from centrifuging 100 ml. of culture liquid was suspended in 20 ml. of a 2% penicillin G-solution in phosphate buffer of pH 7.6 to 7.8 (in Erlenmeyer flasks) and agitated under the above-mentioned conditions for 20 hours. The estimation of the enzymatic activity was carried out by iodometric dosage of the potassium G penicillin. A bacterial mass was obtained having a potassium G penicillin splitting yield comprised between 80 and 85%.

Example 2

The procedure was the same as in Example 1, but part of the peptone was replaced (0.1% urea, 0.15% peptone). A bacterial mass was obtained having splitting yield 58%, as against 57%.

Example 3

The procedure was the same as in Example 1 and 2, but the peptone was replaced by 0.3% urea. A bacterial mass was obtained, having splitting yield 68%, as against 57%.

Example 4

The procedure was the same as in Example 1, but all the peptone was replaced by 0.5% urea. A yield of 74% was obtained, as against 57%.

Example 5

The procedure was the same as in Example 1, but replacing the peptone by 1% urea; the yield was 0% as against 57%.

Example 6

The procedure was the same as in Example 1, but the peptone was replaced by 0.5% urea and 0.05% of lecithin was added as stimulator; the yield was 72%, as against 57%.

Example 7

The procedure was the same as in Example 1, but using maize extract in a 2.5% ratio. The obtained yield was 72%, as against 57%.

Example 8

The procedure was the same as in Example 1, but using maize extract in a 3% ratio. The obtained yield was 74%, as against 57%.

Example 9

The procedure was the same as in Examples 1 to 8, but maize extract in a 3.5% ratio was used; the obtained yield was 70%, as against 57%.

Example 10

The procedure was the same as in Examples 1 to 9, but sodium chloride in a 0.2% ratio was used. Yield was 70%, as against 57%.

Example 11

The procedure was the same as in Example 1, but using sodium chloride in a 0.3% ratio. The obtained yield was 71%, as against 57%.

Example 12

The procedure was the same as in Example 1, but using phenylacetamide in a 0.15% ratio. The yield was 68%, as against 57%.

Example 13

The procedure was the same as in Example 1, but using phenylacetamide in a 0.2% ratio. The obtained yield was 70%, as against 57%.

Example 14

The procedure was the same as in Example 1, but 0.3% of phenylacetamide was used. The yield was 68%, as against 57%.

Examples 2–14 were carried out in comparison with systems in which the nitrogen source of the medium was peptone.

We claim:

1. A medium for the culture of an *E. coli* strain for producing penicillin-splitting enzyme, which comprises urea as a nitrogen source in an amount of 0.1 to 1% by weight of the medium, lecithin in an amount of 0.01 to 0.05% by weight of the medium, and 2.5 to 3.5% of corn steep liquor containing about 50% solids.

2. The medium defined in claim 1 which contains 0.15 to 0.3% by weight phenylacetamide.

3. The medium defined in claim 1 which contains 0.02 to 0.3% sodium chloride.

4. A method of producing an *E. coli* strain capable of forming penicillin-splitting enzyme comprising the steps of inoculating a medium containing an energy source, 0.1 to 1% by weight of urea as a nitrogen source and 0.01 to 0.05% by weight lecithin with said *E. coli* strain; and culturing said strain on said medium at a pH of about 7, and a temperature of about 20° C. to 45° C. under aerobic conditions.

5. The process defined in claim 4 wherein said medium contains 0.2 to 0.3% by weight of sodium chloride.

6. The process defined in claim 1 further comprising the step of producing a penicillin-splitting enzyme with the culture formed in said medium.

References Cited

UNITED STATES PATENTS 3,116,218  12/1963  Kaufmann et al. _____ 195—36 P
3,622,462  11/1971  Delin et al. _____ 195—66 R LIONEL M. SHAPIRO, Primary Examiner U.S. Cl. X.R.

195—100, 114, 36 P